United States Patent
Sinz et al.

(10) Patent No.: US 7,533,404 B2
(45) Date of Patent: May 12, 2009

(54) APPARATUS AND METHOD FOR MERGING MPEG STREAMS IN A HEADEND SYSTEM

(75) Inventors: Michael Sinz, Elverson, PA (US); Jonathan Wurtz, Bryn Mawr, PA (US)

(73) Assignee: Cox Communications, Inc., Atlanta, GA (US)

( * ) Notice: Subject to any disclaimer, the term of this patent is extended or adjusted under 35 U.S.C. 154(b) by 924 days.

(21) Appl. No.: 10/025,055

(22) Filed: Dec. 19, 2001

(65) Prior Publication Data

US 2003/0135861 A1    Jul. 17, 2003

(51) Int. Cl.
*H04N 7/16* (2006.01)
*H04N 7/173* (2006.01)

(52) U.S. Cl. ................ 725/93; 725/144; 725/146

(58) Field of Classification Search ............ 725/91, 725/93–95, 97, 114, 116, 117, 138, 144, 725/146, 147

See application file for complete search history.

(56) References Cited

U.S. PATENT DOCUMENTS

| | | | | |
|---|---|---|---|---|
| 5,917,830 A | * | 6/1999 | Chen et al. | 370/487 |
| 5,963,557 A | * | 10/1999 | Eng | 370/432 |
| 6,832,323 B1 | * | 12/2004 | Booth et al. | 726/21 |
| 6,948,186 B1 | * | 9/2005 | Brosey | 725/151 |
| 2002/0138500 A1 | * | 9/2002 | Bechtel et al. | 707/104.1 |
| 2003/0097663 A1 | * | 5/2003 | Puputti | 725/132 |
| 2006/0020974 A1 | * | 1/2006 | Birnbaum et al. | 725/50 |

\* cited by examiner

*Primary Examiner*—Hunter B. Lonsberry
(74) *Attorney, Agent, or Firm*—Merchant & Gould

(57) ABSTRACT

A headend system includes an apparatus. The apparatus comprises receives a plurality of separate MPEG input streams; merges the plurality of separate input streams, and outputs a merged stream that is capable of being processed by a single PID processor in a television converter apparatus.

24 Claims, 4 Drawing Sheets

APPARATUS AND METHOD FOR MERGING MPEG STREAMS IN A HEADEND SYSTEM

FIELD OF THE INVENTION

The present invention relates to television transmission systems, such as cable systems and satellite systems.

BACKGROUND OF THE INVENTION

Cable and satellite television transmission systems have become increasingly robust in recent years, moving beyond the more traditional television and pay-per-view (PPV) services that prevailed in the 1990's. Accordingly, consumer devices, such as cable set top terminals have become increasingly more versatile to accommodate new system capabilities. For example, the DCT-2000 (digital consumer terminal) set top box by Motorola, Inc. of Horsham, Pa. can be configured to support real time reverse path communications, providing a gateway to interactive services such as video on demand (VOD), Internet Access, Email, Home Shopping, E-commerce and the like.

To support these different applications and services, the set top box has a plurality of Processor Identifier (PID) processors. PIDs carry data to identify data streams within an MPEG multiplex. A PID Processor is a device within the television set top converter box that knows how to "listen" for a specific PID for which it has been requested to "listen", and separates out data streams (PIDs) from the overall MPEG multiplex stream received by the set top box. Each PID processor can be programmed to respond to a respectively different stream input. For example, the DCT-2000 has a hardware limit of six PID packet processors. There may be many more data streams on the cable, but at any given time, the DCT-2000 can only process up to six unique MPEG (motion picture exploitation group) streams.

However, due to the design of the "cable system" (which includes the digital data stream design and set top management design), many of these PID processors are typically allocated to core system functions, which are used for television viewing. The core system functions include such basics as telling the set top how to find other channels and other data, telling the set top for which channels/data it is authorized, sending new control software to the set top, verifying that the set top is working correctly, sending configuration information as to the set top network connection, and the like.

With the advent of additional television services, additional application programs are required by the set top box. Data links are needed to support third party applications running within the set top box. For example, the WorldGate service (by WorldGate Inc. of Trevose, Pa.) needs a data link to exchange data to control when to display an "Interactive Content Here" button, and uses a link to send down the "TV Menu Pad" images. Television programming applications guide may need a link to download the TV schedule. The system uses the links to get the time and to download new software. The number of PID processors is limited. In many systems, no more PID processors are available to process the incoming data streams needed by these applications. In this situation, no new programs or features can be added that require dedicated PIDs, because there are no more PID processors available to handle the data. For example, in some systems, most of the available PIDs were allocated for system management and thus in some cases leaving none available for a middleware layer to do its work.

A method and system are desired to allow the addition of new set top application programs that communicate with the headend, without requiring replacement of existing set top boxes.

SUMMARY OF THE INVENTION

The present invention is an apparatus for use in a headend system for receiving a plurality of separate MPEG input streams, and merging the plurality of separate input streams and outputting a merged stream that is capable of being processed by a single PID processor in a television converter apparatus.

OVERVIEW

Figure 1:
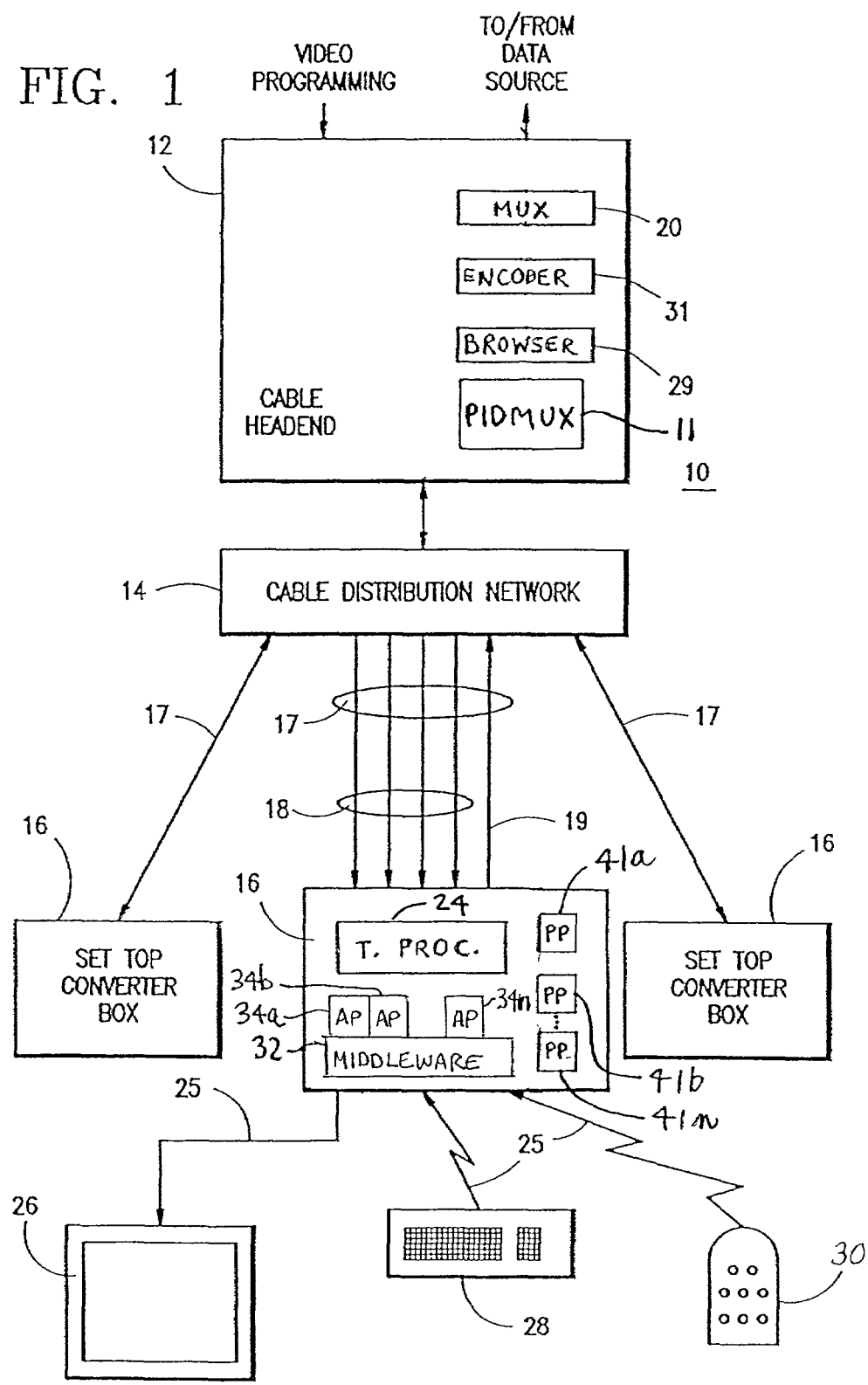
FIG. 1 is block diagram of an exemplary system including a cable headend according to the invention, and a plurality of set top terminals in communication therewith.
Figure 2:
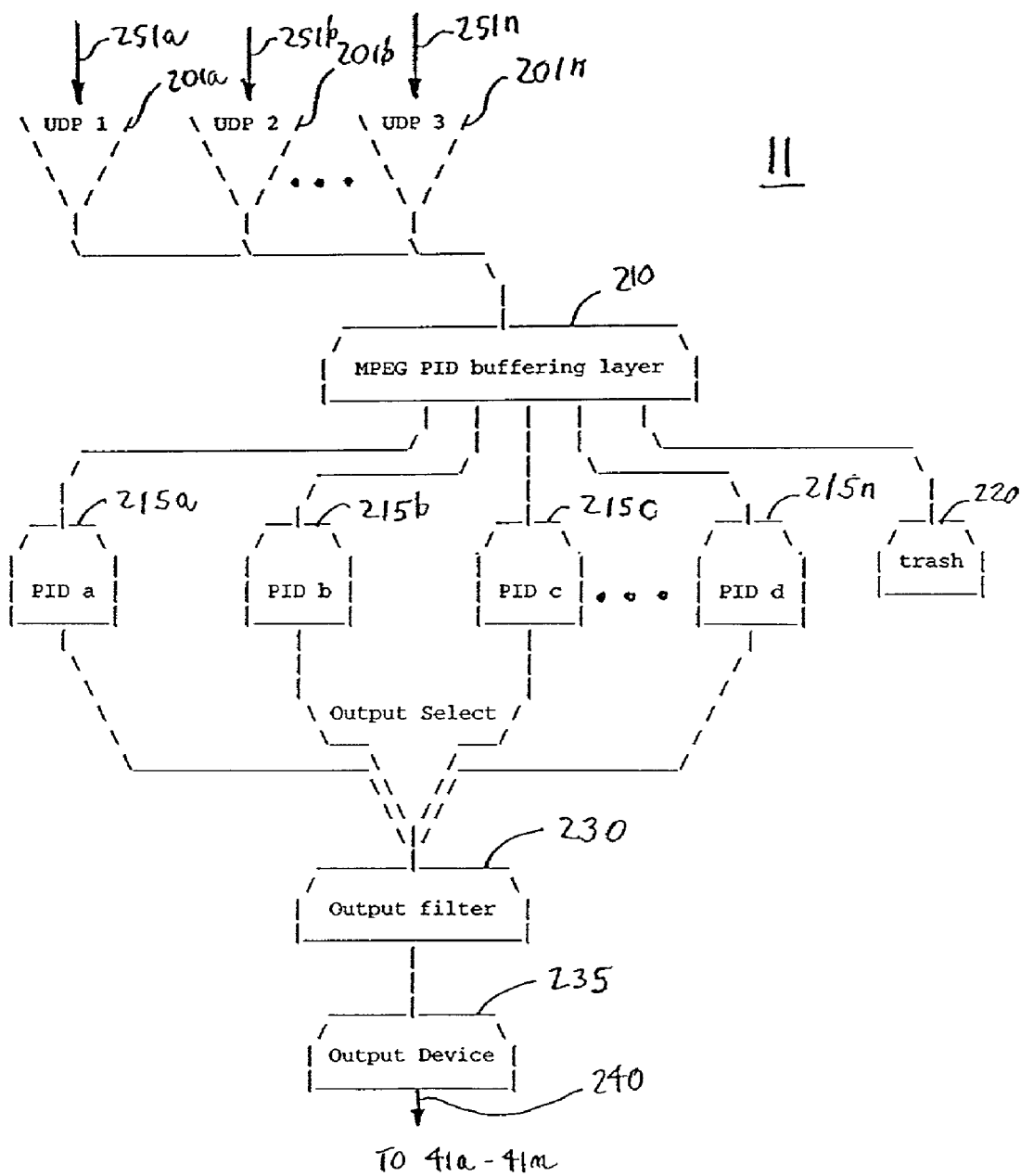
FIG. 2 is a block diagram of the exemplary PIDMUX apparatus shown in FIG. 1.

Referring to FIGS. 1 and 2, the exemplary embodiment of the invention includes an apparatus 11 in the headend system 12, comprising means 201$a$-201$n$ for receiving a plurality of separate MPEG input streams 251$a$-251$n$ and means 11 for merging the plurality of separate input streams and outputting a merged stream 240 that is capable of being processed by a single PID processor 41$a$ in a television converter apparatus 16. The apparatus 11 is referred to herein as the "PIDMUX". The PIDMUX 11 merges data streams 251$a$-251$n$ containing MPEG 2 data. A television converter apparatus 16 that receives the merged stream includes a plurality of PID processors 41$a$-41$n$, one of which processes the merged stream.

In the exemplary embodiment, all of the input streams contain DCII data. Exemplary PIDMUX 11 includes program code tailored to comply with the rules for DCII data transmissions. A DCII packet may be split in at least two portions across at least two MPEG-2 packets within one of the input streams (e.g., 251$a$). As explained below, the merging means 11 does not insert the packets from another one of the plurality of input streams (e.g., 251$b$) between any of the at least two portions of the DCII packet. MPEG transport packets are only 188 bytes, of which only 184 bytes are available for payload. They are always 188 bytes long. The DCII packets (which are carried within a MPEG transport) are up to 1024 bytes in size, and thus could span multiple MPEG packets. (DCII packets can be most any size but must contain the DCII packet header/tail which limits the lower end size to be at least than 3 bytes in length plus payload). Since a DCII packet can span multiple MPEG transport packets, the protocol uses the start bit in the MPEG transport to indicate that a DCII packet is starting within this MPEG transport packet. When this bit is set, the first byte of the payload indicates where within the payload the DCII packet starts. This allows for there to be the start of a DCII packet in any "extra" space after the end of the previous packet within the MPEG transport. However, since there is only one start bit, only one DCII packet may start within any one MPEG transport packet. Thus, it is not possible to place two (or more) complete DCII packets within the same MPEG transport packet.

Also, for the reasons explained above, the merging means does not insert a second DCII packet between any of the at least two portions of the DCII packet. To ensure synchronization, the merging means excludes from the merged stream any received packets that precede a first packet having a start bit that is set. Those skilled in art will understand that any DATA may be merged by an apparatus according to the invention, and the invention is not limited to DCII data.

The receiving means include a plurality of user datagram protocol network ports 201a-201n. The merging means 11 include a respective PID buffer 215a-215n for each one of the input streams. Each PID buffer 215a-215n operates as a state machine 215a-215n. The state machine is initialized in a state in which the merging means 11 does not insert packets from a first one of the input streams 251a between contiguous packets from a second one of the input streams 251b. Each buffer state machine tracks a DCII packet completion state for the input stream corresponding to that PID buffer 215a-215n. Only one of the PID buffers 215a-215n at a time transmits data from its corresponding input stream to an output filter 230. The one of the PID buffers 215a-215n that is currently transmitting data to the output filter 230 continues to transmit data until transmission of a DCII packet is completed.

If a first DCII packet ends within an MPEG packet, and a second DCII packet begins within the same MPEG packet as the end of the first DCII packet, then the one of the PID buffers (e.g., 215a) that is currently transmitting data to the output filter 230 continues to transmit data to the output filter 230 after transmission of the DCII packet is completed. If the MPEG packet does not contain the start of a second DCII packet immediately following the DCII packet, a next one of the PID buffers (e.g., 215b) begins to transmit data to the output filter 230 when an end of a DCII packet contained within an MPEG packet is transmitted to the output filter 230.

In the exemplary system, the plurality of input streams 251a-251n include a first stream 251a having NET PID data (The NET PID contains information such as the time of day to set the clock and the network configuration for interactive operation.) and a second stream 251b having headend management system (HMS) polling data. The NET PID data and HMS polling data are combined into a merged stream 240. The NET PID data stream 251a includes at least one DCII packet that may be split into at least two portions in at least two respective MPEG packets. The merging means 11 does not insert the HMS polling data between any of the at least two portions of the DCII packet.

With the NET PID and HMS polling data received by a single PID processor (e.g., 41a), a PID processor is freed up, so the television converter apparatus can be programmed to receive, for example updated middleware program code via a middleware PID processor. The middleware PID processor (e.g., 41b) extracts all data from that PID.

DETAILED DESCRIPTION

FIG. 1 is a general block diagram of a CATV system 10 which incorporates elements for facilitating the provision of television services and is illustrative of one type of system with which the concepts of the present invention may be employed. It should be noted that the CATV system 10 is illustrated in general form since many of its detailed elements are not necessary for an understanding of the present invention. Further, the invention may be practiced in satellite and HITS systems, and is not limited to cable.

The CATV system 10 includes a cable headend 12 and a cable television distribution network 14 for interfacing the headend 12 to a plurality of set top converter boxes 16. A plurality of transmission links 17 interconnects the set top converter boxes 16 with the distribution network 14. Each of the links 17 is illustrated as being bi-directional with a plurality of downstream channels 18 and one or more upstream channels 19. It will be understood by those of ordinary skill in the art that the links in the present invention are not limited to bi-directional links but they may be one directional links. For clarity, the details of only one of the set top boxes 16 and associated elements are illustrated in FIG. 1.

The cable headend 12 receives video programming from remote sources (not shown), and transmits the video programming and other information through the distribution network 14 to the set top boxes 16. Typically, the video programming is received from the remote source in either an analog format, or a digitally compressed or encoded format, such as MPEG 1 or MPEG 2. Cable headend 12 includes cable headend equipment (which may include encoder 31 and multiplexer 20), consumer service unit/digital service unit (not shown), router (not shown) and headend server (not shown). The headend server has a communications controller and an application server that may include browsers 29, billing applications and the like.

Each of the set top boxes 16 is interfaced via a terminal processor 24 and associated communication links 25 (e.g., cables, infrared wireless links, etc.) to a television or monitor 26, and one or more input devices, such as a wireless keyboard 28 and a remote controller 30. Preferably, the remote control device 30 comprises a computer style keyboard, which communicates with the set top converter box 16 by means of a conventional infrared wireless link. Additionally, a pointing device, such as a mouse or the like (not shown), may be used in conjunction with the keyboard 28. Alternatively, the remote control device 30 may also comprise a conventional television remote control.

The set top box 16 also preferably contains middleware 32 and one or more application programs 34a, 34b, 34n. Middleware, is a layer of software between the network and some of the applications. (Some applications run on the middleware, and others do not.) This middleware software provides services such as identification, authentication, authorization, directories, and security. The middleware 32 interfaces with the terminal processor 24 and the application programs 34a, 34b, 34n to manage the resources of the system and set top box 16. The application programs may include video on demand programs, internet access capabilities, and e-commerce programs, such as an interactive program guide or electronic program guide or the like. It will be understood by those in the art that any application program could be contained in the set top box 16 and managed by the middleware 32, and that the present invention is not limited to the application programs discussed herein.

Each set top box 16 enables a user to select, via an input device 28, 30, for example, one of the downstream channels 18 to be viewed on the television display 26. The user can also select as the output displayed on the television display 26 the output signal of an application program that executes locally in set top box 16 or remotely in headend 12. The set top box 16 has a plurality of PID processors 41a-41n. Although only three PID processors 41a-41n are shown, any number of PID processors may be available. For example, six or more PID processors may be present.

PIDMUX 11 provides an application PID stream 240 that contains a multiplex of all of the application data 251a-251n and allows the "middleware" layer 32 of the set top box 16 to handle splitting up this stream 240 to the various applications 34a, 34b, 34n. PIDMUX 11 acts as a middleware headend component that puts together the multiplexed (merged)

stream 240 based on data inputs 251a-251n for the different components that are working within the middleware. At the head end 12, PIDMUX 11 integrates the MPEG streams 251a-251n from disparate sources into a valid (i.e., complies with rules for packet formats) unified stream 240.

Some applications may require a free PID processor, i.e., a PID processor which is not shared with any other application. PIDMUX 11 can take different MPEG streams 251a-251n that were originally to be processed by different PID processors 41a-41n, and merge them correctly into a single PID processor (e.g., 41a). This also means that at least one of the PIDs is re-targeted. The PID identifies the data stream within the MPEG multiplex 240. When the PID is re-targeted, the processor ID in each packet for that input stream is changed, so that a different PID processor 41b listens for data from that stream. At the set top box 16, a PID processor 41b processes data from the input signal 18 and extracts only the data that are associated with the specific data stream requested by that PID processor. This allows the PID processor 41a to listen for another PID. The additional PID may, for example, hold the middleware data for the WorldGate Service by WorldGate Communication, Inc. By re-targeting data originally to be read by a first PID processor 41a so that the data can be read by a second PID processor 41b, the system can free up a PID processor 41a to allow addition of a new application. It will be understood that the input streams can be retargeted from any of the PIDs to any other PID(s).

FIG. 2 is a block diagram of an exemplary PIDMUX 11. The exemplary PIDMUX 11 can accept input MPEG/DCII transports on up to a number of user datagram protocol (UDP) network ports 251a-251n. For example, there may be up to 64 UDP ports. These ports can each be described with an IP address such that the port can be a multicast port or on a specific interface. All data on these ports are funneled into a single MPEG packet-buffering layer 210.

Each relevant PID 251a-251n is buffered into a PID buffer 215a-215c for that specific PID. (Although FIG. 1 shows three ports 201a-201n and four PID buffers 215a-215n, other numbers of each are contemplated). Any PID (e.g., 251n) that is not being processed is just "dropped" or thrown into the trash 220. (PIDs that are not to be processed are specifically ignored, as other devices on the network will process them, or they have been mis-addressed and should not be forwarded.)

Each $n^{th}$ PID buffer 215a-215n is a mini state machine that tracks the DCII packet state within the corresponding $n^{th}$ MPEG packet stream for that PID. The Motorola DCII protocol requires that the DCII packets within a single MPEG PID be contiguous, as the format does not waste bandwidth on extra headers in each MPEG packet.

The PID buffer state machines track the DCII-to-MPEG packet alignment and synchronize to the DCII data stream within the MPEG. The state machines discard any packets until the PID has been synchronized with the DCII stream. This happens when an MPEG "start" packet is recognized.

Referring again to FIG. 2, on the output side, only one of the PID buffers 215a-215n at a time empties into the output filter 230. The PID buffer currently transferring data (e.g., 215a) sends the data to the output filter 230 until it has completed a DCII packet and did not already start another DCII packet within the same MPEG packet, as explained below with reference to FIG. 3.

The output stage does not split an MPEG packet into multiple MPEG packets, so it is possible for one DCII packet to end and another DCII packet to start within the same MPEG packet, thus keeping the PID within an uncompleted DCII packet.

For each PID, the PID buffer 215a-215n contains the data and past state of the data. This allows buffering of incomplete data. These data can built up as the different data streams are worked into the output buffers.

Note that, if no data comes into a PID state machine for more than <n> seconds (where n is a configurable timeout value that may, for example, default to 5 seconds) and the DCII state still does not reflect a completed DCII packet, the PID state machine marks that PID as being unsynchronized and skips to the next PID to be processed. This "dead data" timeout prevents a state machine lockup if there is loss of a data stream in the middle of a DCII packet.

Also, the number of outstanding MPEG packets on a stream is limited. With this number set to 64, each PID buffer uses a small address space (e.g., about 12 Kbytes). This should be set so that the high water mark support in a queuetriggers a push with some headroom left. Also this headroom can be used when a stream fails and thus the timeout is needed to skip past the dead stream.

Once a completed DCII packet occurs within an MPEG packet, the output filter 230 switches to the next PID buffer (e.g., 215b). Thus, the PID buffers 215a-215n are processed round-robin at DCII packet boundaries.

The output filter 230 takes the incoming MPEG stream (as sent from the PID state machines and selected based on DCII packet boundary fairness), renumbers the MPEG PID value, and updates the MPEG continuity counters. These last steps produce a valid MPEG data stream on the new target PID.

The output device 235 is one of either a network UDP address/port, a hardware device such as the serial port, or STDOUT (the default output stream assigned to a program when it is run), which can then be redirected via standard output redirection mechanisms to a file, device or the like. In the exemplary embodiment, up to five MPEGpackets are included in an output UDP packet. It is understood that any reasonable number of MPEG packets can be included in an output UDP packet.

The exemplary PIDMUX tool 11 is specifically configured to accommodate MPEG and DC-II data format requirements and limitations (although a PIDMUX can readily be configured to handle input streams without DCII data). The state machine that implements this protocol is described below with reference to FIG. 3, but first a general explanation of the DCII constraints is provided.

First, the polling data arrive in a PID that is not the target PID. This means that the polling data are not formatted with the NET PID (which contains network configuration/control data) within the MPEG transport layer. This is because the polling data were originally formatted to use either the EMM PID in a standard headend or its own POLLING PID in a HITS/NAS headend. The POLLING PID contains, polling data, which was previously part of the EMM data stream and thus sent via the EMM PID in the prior art (and thus processed by the PID processor allocated to the EMM PID) In the NAS/HITS environment, the Polling data are generated locally and thus, in the prior art, Polling data had to be put into its own data stream (PID) which is referred to as the POLLING PID. Thus, in the prior art, a PID processor was used to monitor the POLLING PID, thus using up a valuable resource). Also, because the polling data have not been correctly merged yet—the PIDMUX 11 is the tool that performs the correct merging operation—polling data must not yet be within the same PID as the NET PID. These MPEG packets are re-targeted to the target output PID.

Second, the MPEG frames (188 bytes long) must have "valid" sequencing numbers. This is critical for correct operation of the receiving end of an MPEG data stream. In addition to correcting the sequencing of the MPEG packets, DCII packets, which may span multiple MPEG packets, are not split; i.e., a packet from another stream cannot be inserted in the merged stream between two consecutive portions of a DCII packet that spans multiple MPEG packets. In the polling data re-targeting context, this means that the packets need to be examined for DCII data, and checked so as not to merge the POLL PID packets into the middle of a DCII packet on the NET PID.

The combination of the MPEG merge with the DCII merge makes the exemplary PIDMUX 11 both useful and flexible in a Motorola Digital Cable (DCII) system. This example provides a general solution for the merging of two disparate MPEG streams that may contain DCII data. Because PID-MUX is a "general" tool, it is not limited to the NET and POLLING PIDs described above. It can do any number of PIDs from multiple data streams.

The PID MUX does depend on the MPEG data to be valid, which includes the fact that the start bit is set at the start of a message. The exemplary PIDMUX 11 drops all packets until it receives the first start packet from any PID. This allows PIDMUX 11 to sync up with the PID.

The command line may include:

| | |
|---|---|
| -l \<port\> | Listen on UDP port \<port\> (can be listed multiple times) The port can also have an IP address to bind to: IP:PORT |
| -p \<pid\> | Process incoming PID \<pid\> (can be listed multiple times) |
| -t \<pid\> | Target output stream to be on PID \<pid\> |
| -o \<out\> | Send output to device/file/UDP socket |
| -x \<sec\> | Timeout (in seconds) for a dead PID |
| -h | Show the list of command line options |
| -d | Run in debug/verbose mode. Multiple -d will increase the amount of debug output. |

Because the understanding of the merge conditions depends on having seen at least one packet from the main stream, there is a potentially relatively long latency at initial startup. Merging is only permitted between DCII packets or a similar form of packets. DCII packets can only be merged at DCII packet boundaries, not just at MPEG packet boundaries. A DCII packet can, however, span multiple MPEG packets, and thus all of the MPEG packets containing the split DCII packet are transferred together before merging data from other input streams. The merging process (PIDMUX) thus makes sure its internal understanding of the DCII data is valid before it assumes it can merge streams by utilizing a simple state machine that knows the state of the DCII data, described below with reference to FIG. 3. When the state machine has a correct reading of a DCII packet, it can then also get a correct reading of when/where that packet ends, and thus knows at what point data from a different data stream can be merged.

The exemplary PIDMUX 11 starts in a state in which it assumes that it cannot split data, since it does not yet know the DCII packet start size information. The PIDMUX tool 11 depends on receiving data on certain UDP ports 201a-201n. However, the PIDMUX tool 11 can listen on multiple network connections at once. This ensures that multiple data sources can reliably get the data packets to PIDMUX 11. All of the ports 201a-201n to which a specific PIDMUX process listens normally correspond to a data source. All ports 201a-201n lead to the same location.

DCII data, when encapsulated within MPEG streams presents an additional issue: When the start bit is set in the MPEG header, the first byte of payload is the offset where the DCII data starts within the packet. This means that the DCII packet can end within an MPEG packet that has the start bit set and has a non-zero offset, such that the datum before the offset is the last bit of data for the previous DCII packet. This results in increased efficiency, except when trying to merge streams, as it provides less chance for a merge point.

A highly efficient solution to this problem is to split the DCII data out of the MPEG stream and then re-package it into MPEG. If a situation arises where there are too many "connected" packets, it may be necessary to depacket and repacket the DCII data streams.

In the exemplary embodiment, DCII packets are not re-packaged. In typical data, the number of DCII packets that would be repackaged is relatively small, so the increase in overall efficiency through re-packing DCII data is not very significant. As it turns out, there is a relatively high likelihood that this would seldom or never happen, as the packet sizes for MPEG (188 bytes) means that there is a reasonably small carryover; otherwise the DCII header would not fit in the linked packet. A DCII packet only will start within the same MPEG packet as the previous DCII packet ended when: (1) there are DCII data already available such that they can be packed, and (2) there is room within the current MPEG packet to do the packing, which requires the DCII packet header to fit. Since both conditions are not always true there is a reasonable number of packets that do have the DCII data end at MPEG packet boundaries, either because a new DCII packet header does not fit or because there are no data yet for the next DCII packet.) Also, since the data source does not always know that it has yet another packet, it will need to send the current one and thus can not link to the next one as it is not yet ready.

Figure 3:
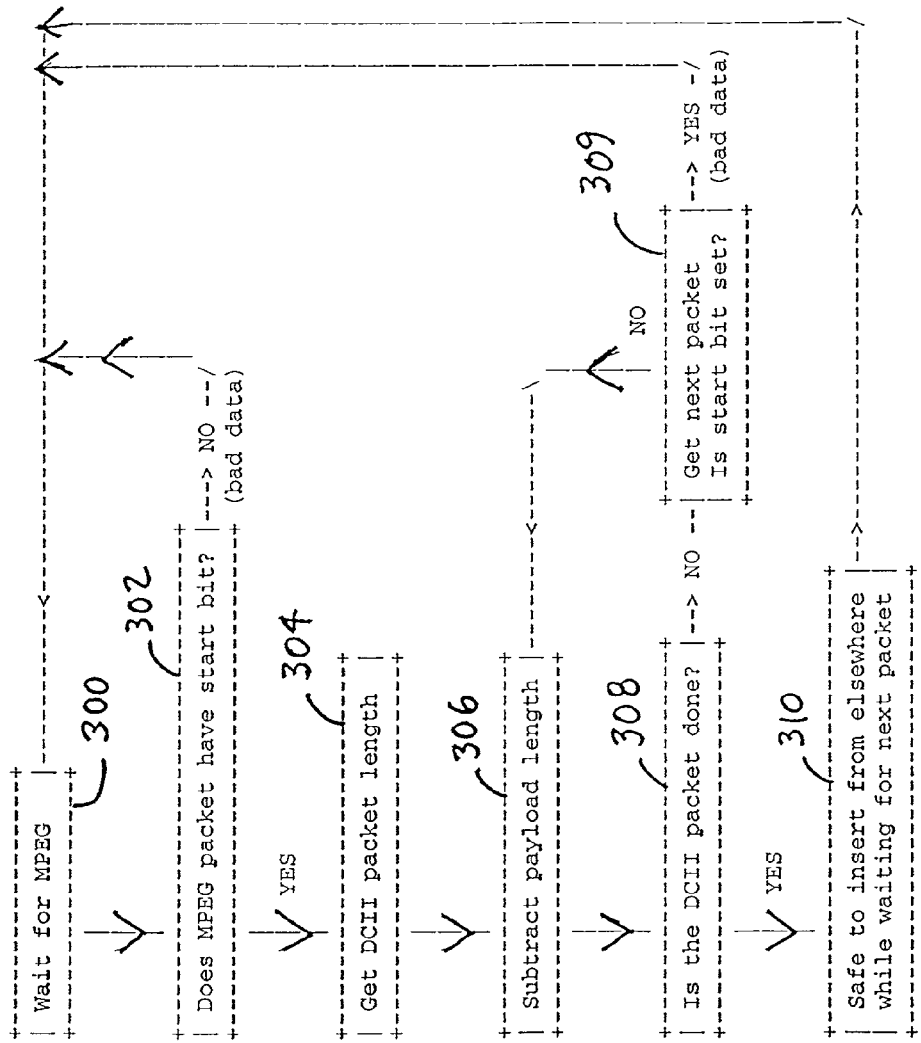
FIG. 3 is a state diagram of one of the PID buffer state machines of the PIDMUX of FIG. 2.

FIG. 3 is a diagram of an exemplary PID buffer state machine. At step 300, the state machine waits for a packet. In this state, the state machine does not allow a separate input stream to insert a packet into the stream currently being output by the PIDMUX 11.

At step 302, when the next MPEG packet arrives, the state machine determines whether the packet is a "start" packet which has a "start" bit set. If the start bit is not set, then the data or packet are considered "bad" and step 300 is repeated.

At step 304, within the MPEG "start" packet, the DCII protocol defines that the first byte contains the offset of the start of a new DCII packet. If this offset is not zero, then the next few bytes are the completion of a previous DCII packet. The DCII header, which is the first few bytes of the start of a DCII packet, contains the length of the DCII packet.

At step 306, the current MPEG packet payload length is subtracted from the DCII packet length, to determine the number of bytes of the current DCII packet that have not yet been received.

At step 308, the PID buffer state machine uses the length to verify the DCII packet and to "determine" when the DCII packet ends. Thus, the PID buffer state machine knows if it is within the middle of a DCII packet or not. If the DCII packet is done, step 310 is executed. If not, step 309 is executed.

At step 309, the next MPEG packet is examined. If the start bit is not set (i.e., the MPEG packet is considered good), then step 306 is repeated. If the start bit is set, (which indicates the start of a new DCII packet while the previous DCII packet has not yet completed), then the DCII packet is considered to contain bad data, and step 300 is repeated.

At step 310, since a DCII packet has just completed transfer to the PIDMUX 11, then it is safe to insert data from another input stream. After step 310, step 300 is repeated.

To enable the exemplary PIDMUX 11 to perform the DCII data merge, the PIDMUX tool described above specifically requires data be of DCII protocol. The DCII data in a digital cable system is carried within an MPEG data multiplex 240.

In this system, the MPEG data multiplex 240 needs to be merged, but with the understanding of the DCII protocol. Although the exemplary PIDMUX tool can be used in any Motorola/DCII based digital system, this tool can do more than just merge DCII system data in order to free up a PID processor. PIDMUX can also be used as a middleware data-multiplexing engine to merge data from multiple sources into a single output stream. As such, the tool has a much broader scope and application.

An alternative version of the exemplary tool merges data at the MPEG multiplex layer only. This can be used if the data carried within MPEG streams does not have similar restrictions to DCII data or for cases where there are no DCII data within the MPEG multiplex.

Further, one of ordinary skill can readily add an option to the PIDMUX device 11 described above to ignore the DCII layer work.

EXAMPLE

Retargeting HMS Polling Data

When re-targeting an input stream 251a, care should be taken to ensure that compatible input streams are combined, and that any application's need for a dedicated PID and PID processor is respected. For example, in the specific case of National Authorization Service (NAS) controlled Headend in the Sky (HITS) networks, there is a PID processor allocated for polling headend management system (HMS) data. This is a Motorola protocol/data stream that typically (by default) runs on the Entitlement Management Message (EMM) PID (the management PID for security/authorization/etc), but in the NAS system is moved to its own PID. In some set top boxes 16 the available PID processors may be used up, if the HMS polling data is sent to its own PID processor in this fashion, and may not be able to accept additional applications.

In this example, PIDMUX 11 can be used to move the HMS polling data from its own PID processor 41b into the NET PID processor 41a, (where network configuration/control data comes). While this is not the original EMM PID processor used by prior systems to receive the HMS polling data, the set top box 16 does not require the polling data to show up at that particular PID processor 41a-41n. The set top box 16 just needs to receive the data, and as long as the polling data show up via a PID processor that the core system (not applications) is using for system information, the polling data are processed correctly. Thus, the system does not care within which PID within the MPEG multiplex stream 240 the polling data show up, as long as it is a PID that the system is processing with one of its PID processors 41a-41n, i.e., it must be one that the core set top platform code deals with.

The EMM PID and NET PID are such core PIDs. The core platform deals with the EMM PID, the NET PID, and a few other very special PIDs that cannot be easily used for the HMS polling data. The EMM PID and the NET PID best satisfy this criterion, because the other PIDs are not monitored 100% of the time, as the core system uses a single PID processor to bounce among the other PIDs). However, the EMM PID is not considered acceptable to merge new data onto. The main reason for this is that the data rate is high enough that other equipment in the head end may not respond well to seeing the extra traffic on the headend network. In contrast, the ordinary data rate on the NET PID is much lower than on the EMM PID.

Preferably, the EMM PID is also not utilized for merging, because it is preferred to re-target the polling data to the PID that produces the least system impact if there is any disruption in the operation of PIDMUX 11. A failure of the PIDMUX 11 would cause all of the data that are being handled/merged by PIDMUX to stop. Because the EMM data controls the authorization data streams, the set top box 16 would no longer receive the authorization keys for channels that require special ordering (such as premium stations or PPV, VOD, and the like). These channels would then be blocked to the customers' homes. This would interfere with the customers' basic ability to watch programs that the customer is entitled to watch, and is an unacceptable result. On the other hand, a failure that prevents receipt of the NET PID data would have less of an impact on television viewing, so the impact to the customer in the event of a failure would be much less.

Moving the HMS polling data to the NET PID provides for the lowest traffic overhead for the out of band modulator (OM, not shown) in headend 12, which is already rather busy, and it provides for the least disruption of data if the PIDMUX device 11 fails. A failure would be limited to the NET and HMS polling data. If the PIDMUX fails, any data being processed via the PIDMUX would stop. The NET PID contains non-critical information for the Television-watching activity. The NET PID contains information such as the time of day to set the clock and the network configuration for interactive operation. The ability to watch television programming is considered the highest priority activity in the set top box 16, and a failure of the NET PID should not interrupt that.

Another consideration is that the set top 16 should be programmed to not ask for the resources of a unique PID processor for the polling data but rather to operate in its "default" mode. In this default mode, more than one input stream are received by the same PID processor. Once the set top 16 stops trying to reserve a separate PID for the polling data, a PID processor 41a becomes available, and thus allows an additional application, to make it into the box. For example, in an exemplary configuration, by freeing up a PID processor that no longer is reserved for HMS polling data, the WorldGate Middleware software application has the ability to use that PID processor to "listen" for its corresponding Middleware data stream (the Middleware PID). The middleware application can then have a PID of its own that is not shared with any other application.

The flow of information is as follows:

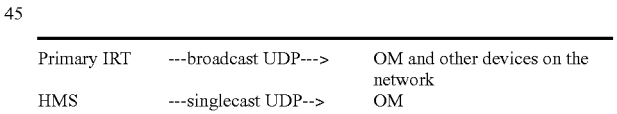

where IRT is Integrated Receiver/Transcoder and UDP is user datagram protocol. The IRT is located in the headend and is (usually) connected to a satellite dish for its data input. It decodes a certain frequency and sends the resultant data over the Operation, Administration, Maintenance, and Provisioning (OAM&P) network to the required targets.

However, using PIDMUX 11, the OM is configured to ignore the NET PID from the Primary IRT and to bounce the HMS Polling PID up to PIDMUX 11. PIDMUX 11 watches the Primary IRT broadcast for the NET PID data and for the Polling PID data from the OM.

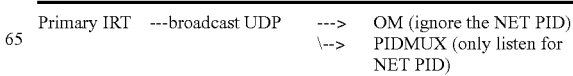

-continued

| | | | |
|---|---|---|---|
| HMS | --- singlecast UDP | --> | OM (bounce Polling PID to PIDMUX) |
| OM | --- singlecast UDP | --> | PIDMUX (polling data from OM/HMS) |
| PIDMUX | --- singlecast UDP | --> | OM (combined NET and Polling PID) |

The exemplary PIDMUX 11 is designed to accept a plurality of input streams 251a-251n, each of which is to be read by a respectively different PID processor 41a-41n in the set top box 16. However, the method described below may be used for correctly merging two data streams that already have the same PID identifier in them.

Figure 4:
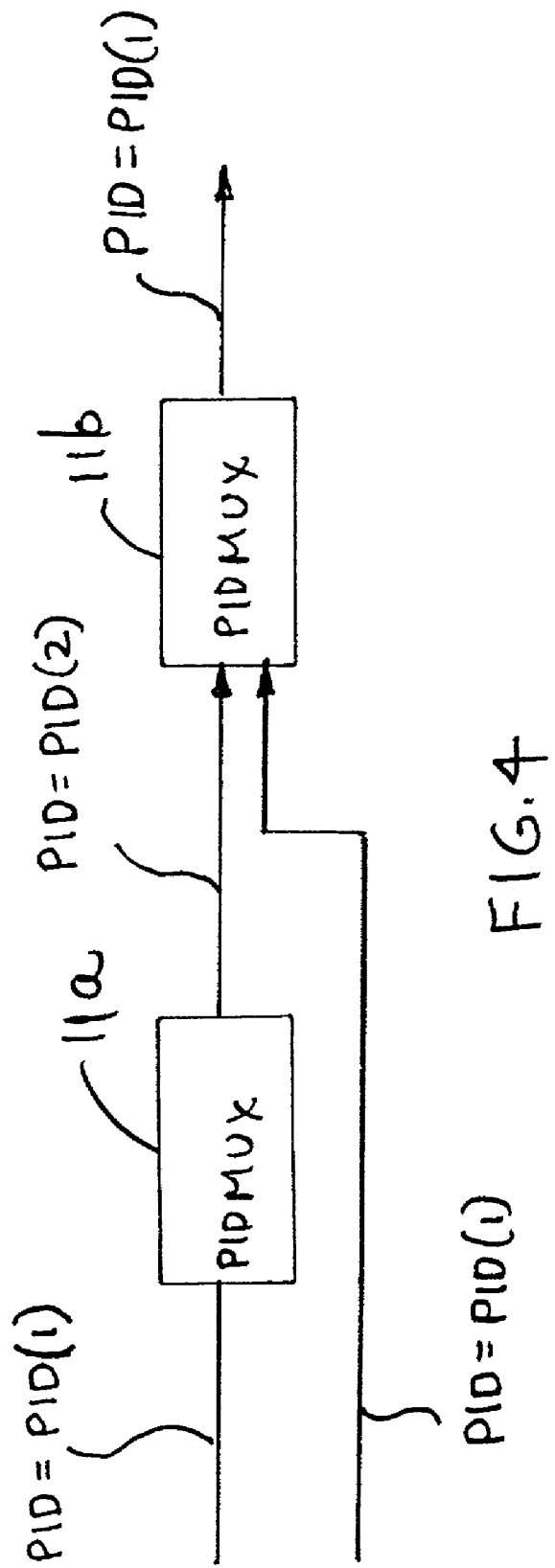
FIG. 4 is a block diagram of a system including two of the PIDMUX's shown in FIG. 2, for merging two streams that share the same PID.

As shown in FIG. 4, by using a multi-layer PIDMUX configuration, the two data sources for the same PID can be provided to two different PIDMUX processes 11a, 11b. One of the PIDMUX's 11a is configured to be the data source for the other PIDMUX 11b, thus making a multi-stage operation. One instance 11a re-targets one of the sources into a new PID being sent out to a UDP port on the local host. The other instance 11b of this tool listens for the other source and the UDP port on the local host, mixing the two different PIDs back into the same target PID and sending the output to the required location.

Assume that there are two data streams (for which PID=PID(1) and PID=PID(2), respectively) to be read by a first PID processor 41a in the set top box 16. The first PIDMUX 11a just re-targets the first PID (that is to be read by a first PID processor 41a) for which PID=PID(1), so that the first PID now indicates it is to be read by a (different) second PID processor 41b, for which PID=PID(2). The first PIDMUX 11a then forwards the modified PID on to the second PIDMUX 11b. At this point, since the two data streams are not tagged as being on the same PID, PIDMUX 11b can correctly merge them.

One of ordinary skill in the art will understand that an alternative embodiment will include a single PIDMUX 11 that parses out and "remerges" data that were already on the same PID.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. Apparatus for use in a headend system, the apparatus comprising:
   means for receiving a plurality of separate MPEG input streams;
   means for merging the plurality of separate input streams and outputting a merged stream that is capable of being processed by a single PID processor in a television converter apparatus;
   wherein the plurality of input streams include a first stream having NET PID data and a second stream having headend management system polling data;
   wherein at least one of the input streams contains DCII data;
   wherein at least one DCII packet is split in at least two portions across at least two MPEG-2 packets within one of the plurality of input streams;
   wherein the merging means does not insert the packets from another one of the plurality of input streams between any of the at least two portions of the DCII packet.

2. The apparatus of claim 1, wherein the merging means does not insert a second DCII packet between any of the at least two portions of the DCII packet.

3. The apparatus of claim 1, wherein the merging means excludes from the merged stream any received packets that precede a first packet having a start bit that is set.

4. The apparatus of claim 1, wherein the merging means include a state machine.

5. The apparatus of claim 4, wherein the state machine is initialized in a state in which the merging means does not insert packets of a first one of the input streams between contiguous packets of a second one of the input streams.

6. The apparatus of claim 1, further comprising second merging means for merging a second plurality of separate input streams and outputting a second merged stream that is capable of being processed by a single PID processor in a television converter apparatus,
wherein:
   a first one of the input streams that is to be received by a first PID processor in the television converter apparatus is received by the first merging means;
   the first merging means transmits the data from the first input stream to the second merging means within a first output data stream having a datum indicating that the first output data stream is to be received by a second PID processor in the television converter apparatus;
   the second merging means merges the first output data stream with a second one of the plurality of input streams that is to be received by the first PID processor in the television converter apparatus to form a second output data stream; and
   the second merging means transmits the second output data stream containing data from the first and second input streams to the first PID processor.

7. The apparatus of claim 1, wherein the receiving means include a plurality of user datagram protocol network ports.

8. The apparatus of claim 1, wherein the merging means include a respective PID buffer for each one of the input streams.

9. The apparatus of claim 8, wherein each PID buffer includes a buffer state machine that tracks a DCII packet completion state for the input stream corresponding to that PID buffer.

10. The apparatus of claim 8, wherein:
the merging means further comprises an output filter, and only one of the PID buffers at a time transmits data from its corresponding input stream to the output filter.

11. The apparatus of claim 10, wherein the one of the PID buffers that is currently transmitting data to the output filter continues to transmit data until transmission of a DCII packet is completed.

12. The apparatus of claim 11, wherein:
an end of the DCII packet is contained within an MPEG packet; and
the one of the PID buffers that is currently transmitting data to the output filter continues to transmit data to the output filter after transmission of the DCII packet is completed, if a second DCII packet begins within the same MPEG packet as the DCII packet.

13. The apparatus of claim 11, wherein a next one of the PID buffers begins to transmit data to the output filter when an end of a DCII packet contained within an MPEG packet is transmitted to the output filter, if the MPEG packet does not contain the start of a second DCII packet immediately following the DCII packet.

14. The apparatus of claim 10, wherein the output filter renumbers an MPEG PID value of the merged stream.

15. The apparatus of claim 10, wherein the output fitter provides the merged stream to one of the group consisting of a network user datagram protocol address/port, a serial port, or a STDOUT.

16. A system comprising:
a headend system and a television converter apparatus;
the headend system comprising:
means for receiving a plurality of separate MPEG input streams;
means for merging the plurality of separate input streams and outputting a merged stream that is capable of being processed by a single PID processor in a television converter apparatus;
wherein the plurality of input streams include a first stream having NET PID data and a second stream having headend management system polling data;
wherein at least one of the input streams contains DCII data;
wherein at least one DCII packet is split in at least two portions across at least two MPEG-2 packets within one of the plurality of input streams;
wherein the merging means does not insert the packets from another one of the plurality of input streams between any of the at least two portions of the DCII packet;
the television converter apparatus including a plurality of PID processors, wherein one of the PID processors processes the merged stream;
wherein the television converter apparatus is programmed to receive headend management system polling data via a PID processor that is also used to receive NET PID data.

17. The system of claim 16, wherein the television converter apparatus is programmed to receive updated middleware program code via a middleware PID processor.

18. The system of claim 17, wherein the middleware PID processor does not extract any other stream from the merged stream except the stream containing the updated middleware program code.

19. A method for operating a headend system, comprising the steps of:
receiving a plurality of separate MPEG input streams;
merging the plurality of separate input streams and outputting a merged stream that is capable of being processed by a single PID processor in a television converter apparatus;
wherein the plurality of input streams include a first stream having NET PID data and a second stream having headend management system polling data;
wherein at least one of the input streams contains DCII data;
wherein the merging step includes splitting at least one DCII packet in at least two portions across at least two MPEG packets within one of the plurality of input streams; and
wherein the merging step includes a step of excluding from the merged stream any received packets that precede a first packet having a start bit that is set.

20. The method of claim 19, wherein the headend has a plurality of buffers, and the merging step includes transmitting data only from one of the buffers at a time to an output.

21. The method of claim 20, further comprising continuing to transmit data from the one of the buffers that is currently transmitting data to the output until transmission of a DCII packet is completed.

22. The method of claim 21, further comprising continuing to transmit data from the same one of the buffers that is currently transmitting data after transmission of the DCII packet is completed, if a second DCII packet begins within the same MPEG packet as the DCII packet.

23. The method of claim 21, further comprising transmitting data from a next one of the buffers when an end of a DCII packet contained within an MPEG packet is transmitted to the output, if the MPEG packet does not contain the start of a second DCII packet immediately following the DCII packet.

24. The apparatus of claim 10, wherein the output filter updates MPEG continuity counters of the merged stream.

* * * * *

UNITED STATES PATENT AND TRADEMARK OFFICE
CERTIFICATE OF CORRECTION

| | | |
|---|---|---|
| PATENT NO. | : 7,533,404 B2 | |
| APPLICATION NO. | : 10/025055 | |
| DATED | : May 12, 2009 | |
| INVENTOR(S) | : Sinz et al. | |

It is certified that error appears in the above-identified patent and that said Letters Patent is hereby corrected as shown below:

Col. 6, line 17: "queuetriggers a push" should read --queue triggers a push--

Signed and Sealed this
Fourteenth Day of June, 2011

David J. Kappos
*Director of the United States Patent and Trademark Office*